(12) United States Patent
Sikorski et al.

(10) Patent No.: US 10,413,021 B2
(45) Date of Patent: Sep. 17, 2019

(54) ILLUMINATED SEAT BELT BUCKLE

(71) Applicant: KEY SAFETY SYSTEMS, INC., Sterling Heights, MI (US)

(72) Inventors: Jeffrey Sikorski, Plymouth, MI (US); Jon Szymanski, Northville, MI (US); Justin Hoag, Grand Rapids, MI (US); Caleb Padilla, Clinton Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 15/760,707

(22) PCT Filed: Sep. 13, 2016

(86) PCT No.: PCT/US2016/051473
§ 371 (c)(1),
(2) Date: Mar. 16, 2018

(87) PCT Pub. No.: WO2017/048692
PCT Pub. Date: Mar. 23, 2017

(65) Prior Publication Data
US 2018/0271226 A1 Sep. 27, 2018

Related U.S. Application Data

(60) Provisional application No. 62/220,215, filed on Sep. 17, 2015.

(51) Int. Cl.
*A44B 11/25* (2006.01)
*F21V 3/02* (2006.01)
*F21Y 115/10* (2016.01)
*F21V 8/00* (2006.01)

(52) U.S. Cl.
CPC ...... *A44B 11/2565* (2013.01); *A44B 11/2515* (2013.01); *F21V 3/02* (2013.01); *F21Y 2115/10* (2016.08); *G02B 6/0096* (2013.01)

(58) Field of Classification Search
CPC .................... A44B 11/2565; B60R 2011/0031
See application file for complete search history.

(56) References Cited

U.S. PATENT DOCUMENTS

| | | | |
|---|---|---|---|
| 5,892,436 A | 4/1999 | Blackburn | |
| 6,558,027 B2 | 5/2003 | Ellis | |
| 2007/0236917 A1 | 10/2007 | Gray | |
| 2010/0013622 A1* | 1/2010 | Rumps | ............... A44B 11/2565 340/457.1 |

(Continued)

FOREIGN PATENT DOCUMENTS

DE 9105784 U1 9/1991

*Primary Examiner* — Sean P Gramling
*Assistant Examiner* — Keith G. Delahoussaye
(74) *Attorney, Agent, or Firm* — David L. King; Markell Seitzman (57) ABSTRACT

A seat belt buckle (10, 50) has a first end (56) configured for fixing the seat belt buckle (10, 50) to a component of a vehicle and a second end (58) opposite the first end provided with a seat belt buckle tongue ejection button (28, 60) and a slot (26) for receiving a seat belt buckle tongue (10*a*), the seat belt buckle includes at least one clear polycarbonate light diffuser (34, 64, 66) and a light source (39, 40, 41) for providing light to be transmitted through the light pipe.

10 Claims, 6 Drawing Sheets

(56) References Cited

U.S. PATENT DOCUMENTS

| | | | |
|---|---|---|---|
| 2012/0089302 A1* | 4/2012 | Griffin | B60R 21/00 701/45 |
| 2014/0239853 A1* | 8/2014 | Woodham | F21V 33/0064 315/362 |
| 2015/0085489 A1* | 3/2015 | Anderson | F21V 19/003 362/249.06 |

* cited by examiner

ILLUMINATED SEAT BELT BUCKLE

FIELD OF THE INVENTION

The present invention relates to an illuminated seat belt buckle having a light transmitter and diffuser.

BACKGROUND OF THE INVENTION

Seat belt buckles are commonly mounted in a vehicle near the base of a vehicle seat and may be difficult for a vehicle occupant to see when attempting to insert or remove a seat belt buckle tongue from the seat belt buckle. Visibility and ease of use of a seat belt buckle may be enhanced by illuminating at least a portion of the seat belt buckle that is to be interacted with by the vehicle occupant when buckling and/or unbuckling the seat belt.

The present invention provides a means of powering the lighting elements with the necessary craftsmanship required for luxury motor vehicles. In addition, the technology is readily available for mass production unlike other lighting technologies proposed previously.

An added benefit to vehicle manufacturers of buckle illumination is the opportunity to promote safety improvements for actual seat belt usage through visible recognition of unbelted conditions. Illumination can be provided in virtually any color based on the desire of vehicle manufacturer's input and can be a constant illumination level (on-off through buckling and unbuckling) or with "fading/increasing" intensity based on the input of sensing and control systems in a vehicle. Seat belt buckle illumination strategies may provide improvements in belt usage through increased visibility, safety through a haptic warning (flashing) when an occupant unbuckles, and even post-crash response time via using the illumination to provide EMS responders an indication of a vehicle occupant's location and the number of occupants in a vehicle.

DISCUSSION OF THE PRIOR ART

U.S. Pat. No. 5,892,436 A discloses a seat belt buckle having an illuminated buckle tongue ejector button wherein a seat belt buckle housing contains a significant number of optical fibers and an illuminating panel structure, the illuminating panel structure including a panel with a reflective surface oriented to reflect light from the optical fibers to the light-transmitting portion of said buckle. The installation of such a large number of optical fibers in a seat belt buckle would be time consuming and expensive making this illumination scheme impractical for commercial use. The present invention provides an illumination scheme that is cost effective and much easier to install in a seat belt buckle.

U.S. Pat. No. 6,558,027 B2 discloses a seat belt buckle having an illuminated buckle tongue ejector button wherein the buckle tongue ejector button contains an electroluminescent panel that is moved with the buckle tongue ejector button. This prior art design requires conductors that will be flexed every time a vehicle occupant depresses the buckle tongue ejector button which is a potential source of failure of the illumination feature of the buckle tongue ejector button.

U.S. Pat. No. 7,360,794 B2 discloses a seat belt buckle with illumination provided by a reflector (lens) usually disposed at a front face of an LED for diffusing and leading light flux of the illumination emitted from the LED.

US 20070236917 A1 discloses a seat belt buckle with a portion of a buckle tongue ejector button back lit by a light source, LED or fiber optics with the light source not in physical communication with the illuminated portion of the buckle tongue ejector button.

EP 1515625 discloses a seat belt buckle with a buckle tongue ejector button provided with a lighting film that can be electrically actuated to identify a part of the seat belt buckle. Films can delaminate or separate from a substructure when employed with a substructure like a buckle tongue ejector button; that buckle tongue ejector button is moved (depressed) thousands of times over the life of the product.

The present invention provides a means of providing the lighting elements in a seat belt buckle with the necessary craftsmanship required for luxury motor vehicles. In addition, the technology is readily available for mass production unlike other prior art lighting technologies associated with seat belt buckles.

SUMMARY OF THE INVENTION

There is provided in accordance with the invention a seat belt buckle having a first end configured for fixing the seat belt buckle to a component of a vehicle and a second end opposite the first end provided with a seat belt buckle tongue ejection button and a slot for receiving a seat belt buckle tongue. The seat belt buckle includes at least one clear light transmitter and diffuser fabricated using, for example, a polycarbonate and a light source for providing light to be transmitted through the light diffuser. For simplicity in presentation the transmitter and diffuser is also referred only as the transmitter and diffuser. As used here the light transmitter and diffuser is also referred to as a diffuser or transmitter. The light diffuser provides at least one user interface at the second end of the seat belt buckle that indicates the location of the slot for receiving a seat belt buckle tongue or the seat belt buckle tongue ejection button. One advantage of the present invention is the light diffuser compared to using thin multiple thin light pipes is the diffuser of the present invention is more visually appealing than the prior art.

In one embodiment, the transmitter and diffuser have three adjacent sides that indicate the general location of the slot for receiving a seat belt buckle tongue and the seat belt buckle tongue ejection button. In a second embodiment, the slot for receiving a seat belt buckle tongue has a pair of opposed long edges and a pair of opposed short edges or ends, the seat belt buckle comprising two clear light transmitters and diffusers each of which is provided with a light source for providing light to be transmitted through the transmitter and diffuser, where each transmitter and diffuser is located adjacent a respective end of the slot.

The slot for receiving a seat belt buckle tongue has a pair of opposed long edges and a pair of opposed short edges, the seat belt buckle comprising two clear polycarbonate LED light pipes, each of the short edges of the slot for receiving a seat belt buckle tongue being identified by a user interface of one of the LED light pipes.

DETAILED DESCRIPTION OF THE INVENTION

Figures 1, 2:
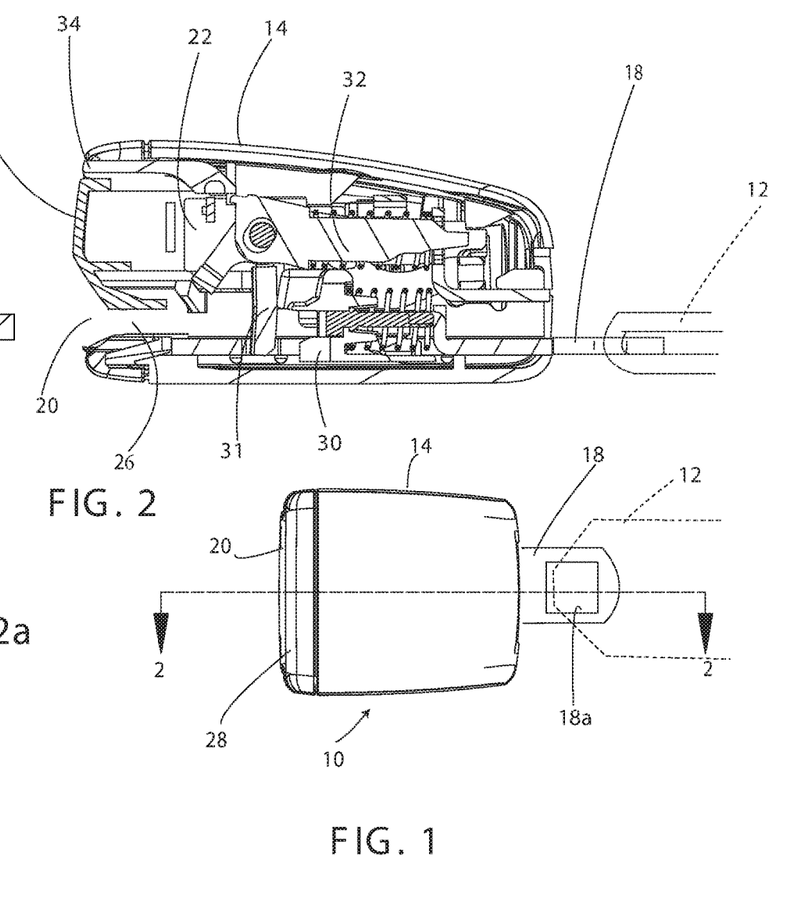
FIG. 1 is a top view of an exemplary seat belt buckle according to a first embodiment of the present invention in a fully assembled configuration.
FIG. 2 is a cross-section of the exemplary seat belt buckle of FIG. 1 taken at line 2-2 of FIG. 1.
Figure 3:
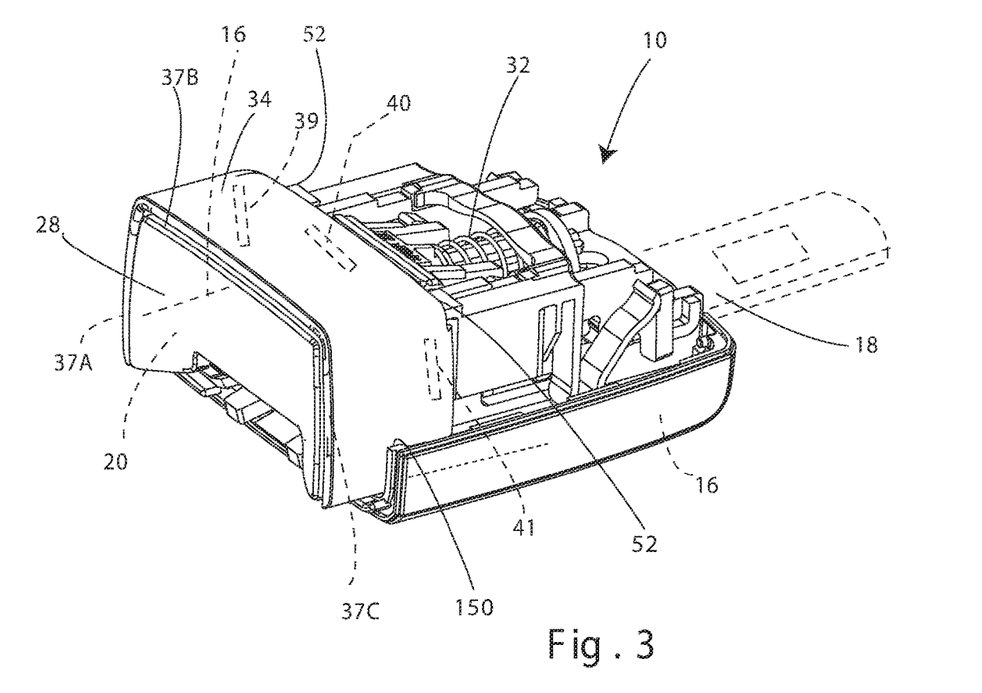
FIG. 3 is a perspective view of the exemplary seat belt buckle of FIG. 1 with a top cover of the seat belt buckle removed.
Figure 4:
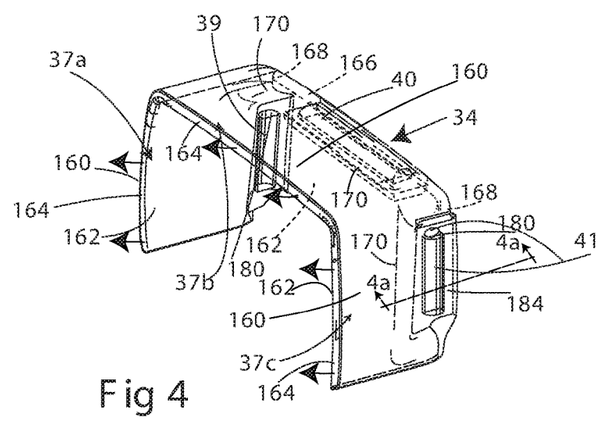
FIG. 4 is a perspective view of an exemplary light diffuser and exemplary light sources used in the exemplary seat belt buckle of FIG. 1.

An exemplary seat belt buckle 10 according to a first embodiment of the present invention is shown in FIGS. 1-4 wherein: FIG. 1 shows a top view of the exemplary seat belt buckle in a fully assembled configuration; FIG. 2 is a cross-section of the seat belt buckle taken at line 2-2 of FIG. 1; FIG. 3 is a perspective view of the exemplary seat belt buckle with a top cover of the seat belt buckle removed to expose interior components of the seat belt buckle; and FIG. 4 is a perspective view of an exemplary light diffuser and exemplary light sources used in the exemplary seat belt buckle.

Figure 2A:
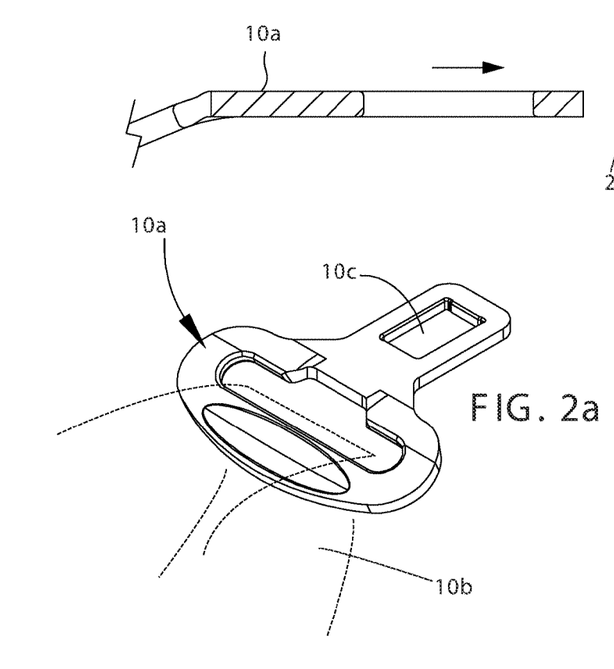
FIG. 2a shows an exemplary tongue.

The exemplary seat belt buckle 10 is provided with a top cover 14 and a bottom cover 16 that encloses and protects a working mechanism comprised of various fixed and movable components in a manner that will be familiar to those who work with seat belt technology. These components include a frame 22 with a variety of stationary and movable components fixed thereto. The seat belt buckle is provided with a slot 26 for receiving a seat belt buckle tongue 10a, only a portion of which is shown in FIG. 2. FIG. 2a shows the tongue 10a through which a length of seat belt webbing 10b extends. The latch receiving opening 10c is also shown. An opening or entry portion of the slot 26 is located at an entry or front end 20 of the seat belt buckle opposite an end of the seat belt buckle associated with a means for anchoring the seat belt buckle to a structural member of the vehicle. While a seat belt buckle may be fixed to a structural member of a vehicle via a length of seat belt webbing 12 that is anchored to the seat belt buckle by an anchor component 18 that is either fixed to or integral to the frame 22, the seat belt buckle may alternatively be fixed to a structural member of a vehicle via a rigid or semi rigid member such as a wire that has one end fixed directly or indirectly to the frame 22 and another end that is fixed directly or indirectly to a structural member of the vehicle. The seat belt buckle tongue ejection button 28 cooperates with miscellaneous seat belt buckle components 32 and an ejector mechanism 30 which pushes the tongue away from the buckle and a lock portion or latch 31 which enters the opening 10c of the tongue to lock the seat belt buckle tongue in place in the seat belt buckle. This latch 31 is shown in its latched or locked position in FIG. 2. The button 28 associated with the ejector mechanism 30 is pushed by a vehicle occupant to release a seat belt buckle tongue from the seat belt buckle when the vehicle occupant wishes to exit the vehicle. U.S. patents such as: U.S. Pat. Nos. 7,395,585 and 8,429,799 are illustrative of the structure and function of prior art buckles having many of the above components. These patents are incorporated herein by reference.

While many people routinely buckle and unbuckle the seat belts without even looking in a vehicle that they regularly operate or ride in, problems can arise when those same people are utilizing a vehicle they are not familiar with. During the hours of darkness or at interior locations that have limited lighting, such as parking decks, a person unfamiliar with a vehicle may have serious difficulty locating the slot in a seat belt buckle for receiving the seat belt buckle tongue when attempting to buckle a seat belt, or locating the release button when attempting to unbuckle the buckle and release the seat belt. While there may have been previous attempts to provide illumination of seat belt buckles to alleviate these problems they have not been widely used by vehicle manufacturers due to cost and reliability factors and cosmetic issues.

A seat belt buckle 10 of the present invention is provided with at least one light diffuser 34 for illuminating the entry end of the buckle to highlight the location of a slot 26 in a seat belt buckle and/or a release button 28 to a vehicle occupant. The light diffusers of the present invention should transmit a significant amount generally uniformly distributed light emitted by an associated light source to provide a user interface to enable the occupant to more efficiently and easily insert a tongue into the buckle. The light diffuser is associated with at least one light source 39, 40, 41 that preferably comprises at least one light emitting diode (LED) selected in accordance with good engineering practices. However, it is understood any suitable light source including small incandescent lamps may be used in the practice of the present invention. Each light source associated with a light diffuser is provided with sufficient electrical power by a circuit including a power source designed in accordance with good engineering practices. This circuitry and power source are well known and not further described.

The "light diffuser" of the present invention is a solid or semi-solid that can flex transparent plastic or otherwise transparent glass-like member for transmitting light from a light source to provide or create a user interface.

The exemplary seat belt buckle disclosed herein employs the light diffuser because the diffuser of the present invention offers uniform illumination, reduced shadowing and dare, design flexibility, and relatively easy installation compared to conventional long, cylindrical plastic light pipes. A molded plastic light diffuser 34 of the present invention may take on virtually any highly complex shape that employs curved surfaces such as 170 or has sharp prismatic folds that enhance the light reflecting off angled corners. Multiple cylindrically shaped light diffusers may be molded from a single piece of plastic, permitting easy assembly into the buckle. In one embodiment of the present invention the diffuser can be snapped into place or heat welded to a local plastic part of a cover. Numerals 150 of FIG. 3 show locations of a weld of the diffuser 34 to a portion of one of the covers such as 16. Numeral 212 of FIG. 5 shows a location where the diffuser could be secured to a portion of the frame by snap or interference fit.

It is desirable to select a material for a solid transparent light diffuser that has high light transmission and diffusivity. At least one exemplary prototype illuminated seat belt buckle of the present invention as illustrated in FIG. 4 has been manufactured with the light diffuser comprising a clear polycarbonate material formed in a three-sided perimeter shape. A suitable clear thermoplastic polycarbonate plastic material suitable for the present invention is marketed with the trademark MAKROLON®, grade 2407, color 021533. In its product literature Bayer claims MAKROLON® has properties of high transparency, heat resistance, toughness and dimensional stability coupled with a high creep modulus, good electrical insulation properties, and is suitable for injection molding the light diffuser 34.

Figure 4A:
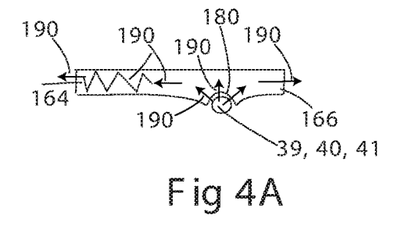
FIG. 4A is a cross-section of a portion of a diffuser showing how an LED is held in place.
Figure 4B:
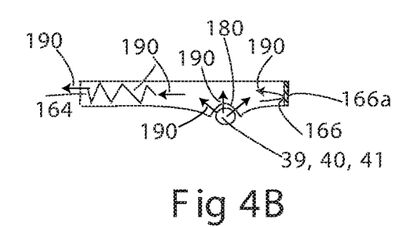
FIG. 4B shows another embodiment of the invention.

FIG. 4 a perspective view of an exemplary light diffuser 34 of the type used in the seat belt buckle 10 of FIGS. 1-3 which has three sides 37A, 37B, and 37C defining a three-sided perimeter shape configured to overlay the seat belt buckle tongue elector button (60) as illustrated. Each side includes an outer surface 160 and an inner surface 162, each of these surfaces being generally flat at least in the region of the entry side of the buckle. Each side also includes a front face 164 and a rear face 166. Situated at the rear of each inner surface 162 is a projection 170. Each projection 170 extends inwardly from its respective inner surface 162. Each projection is formed with a recess 180; the structure of the projection about the recess 180 forming a wall 184. The exemplary LED light sources are 39, 40, and 41. Each LED is cylindrical in shape. One LED 41 is shown within its recess 180 in FIG. 4. The other LEDs would also be fitted to their corresponding recesses of the corresponding projections 170 within the walled portion 184. FIG. 4A is a cross-section through line 4a-4a of FIG. 4. This figure shows the end of an exemplary LED fitted into its recess. The LED can be over molded with the diffuser 34 formed about it or welded to the diffuser or snap or interference fit into the recess. The arrow 190 shows the typical light pattern produced by an LED. As can be seen this light pattern is illuminating the recess 180. Thereafter the light is transmitted and diffused throughout the various sides of the diffuser and extends out of the end surfaces 164, 166 (also shown by arrow 190) to provide the desired uniformly illuminated light pattern seen by the vehicle occupant. In FIG. 4A the LED is shown spaced from the recess 180 for purposes of illustration. This light diffuser when illuminated will indicate the location of a seat belt buckle tongue ejection button 28 and a slot 26 into which a seat belt buckle tongue is inserted. Thus a vehicle occupant can easily locate where to insert the seat belt buckle tongue when buckling the seat belt or where to press to eject the seat belt buckle tongue when exiting the vehicle even under conditions of low or no ambient lighting. The LEDs can be over molded into the diffuser, or taped to the diffuser. The LEDs can be part of a circuit board which is mounted to the buckle frame or LEDs can be attached to another piece of material which is then snapped onto the diffuser. Numeral 190 in FIG. 4B is also illustrative of the reflected, transmitted and diffused light emanating from the diffuser 34. FIG. 4B shows another embodiment of the invention which is similar to that shown in FIG. 4A. In FIG. 4B end 166a is coated or otherwise formed with a reflective layer. This way a greater amount of light is directed at and through the diffuser (34) to outline by illumination the tongue slot (26) and the seat belt buckle tongue ejection button (60).

Figure 5:
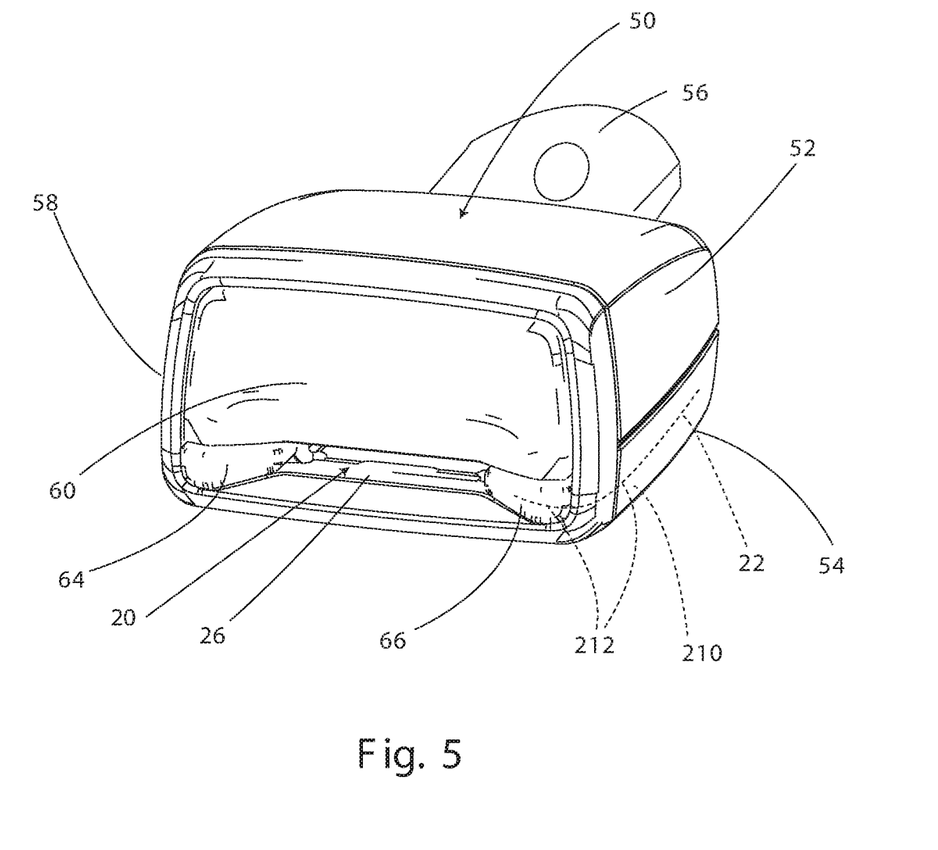
FIG. 5 is a perspective view of an exemplary seat belt buckle according to a second embodiment of the present invention in a fully assembled configuration.
Figure 6:
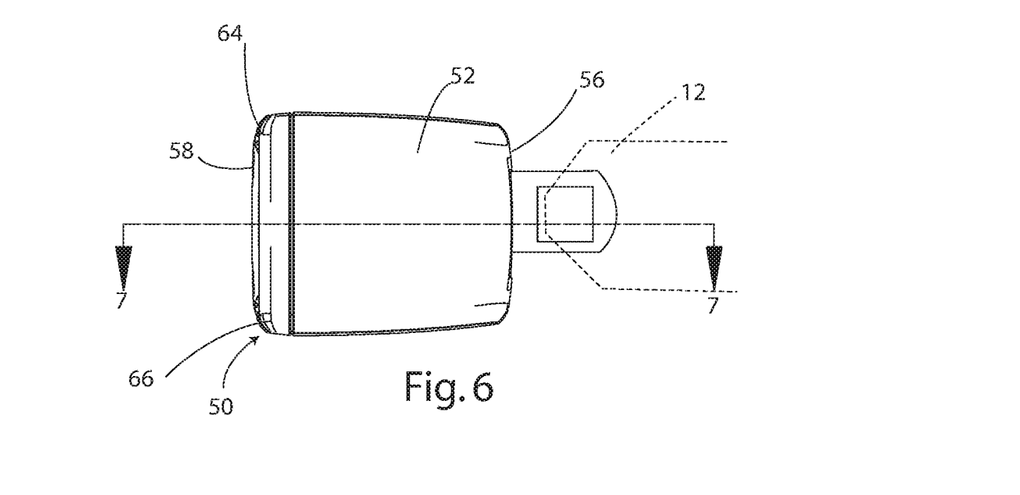
FIG. 6 is a top view of the exemplary seat belt buckle of FIG. 5 in a fully assembled configuration.
Figure 7:
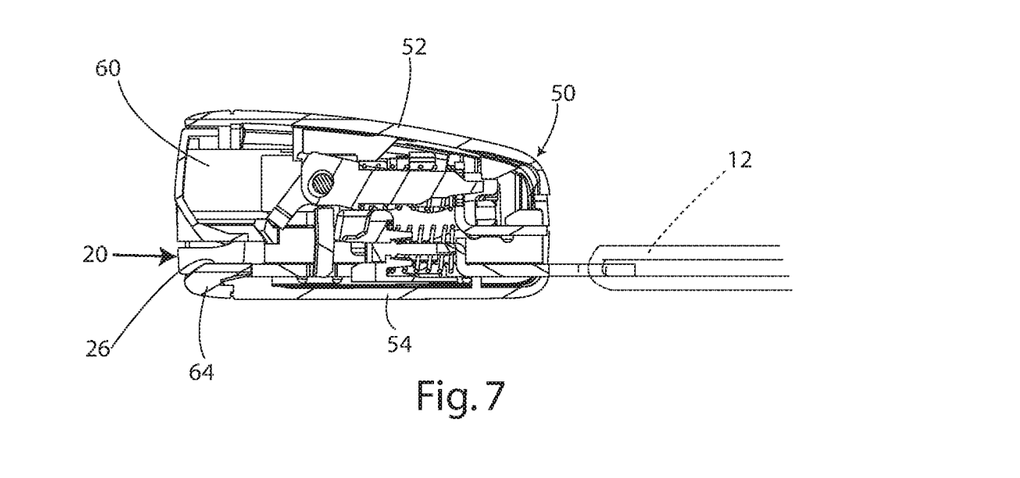
FIG. 7 is a cross-section of the exemplary seat belt buckle of FIG. 5 taken at line 7-7 of FIG. 6.
Figure 8:
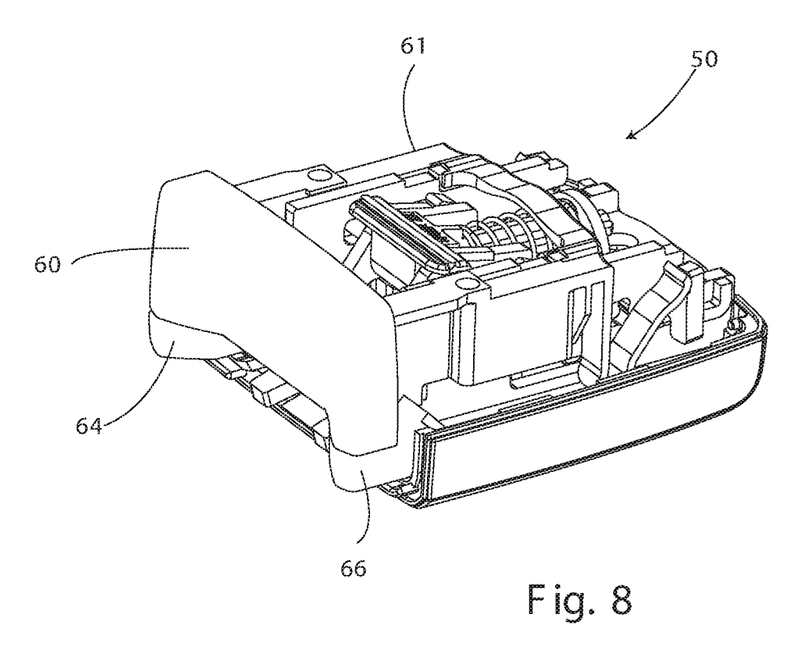
FIG. 8 is a perspective view of the exemplary seat belt buckle of FIG. 5 with the top and bottom covers removed and only the frame portion of the seat belt buckle shown with the seat belt buckle tongue ejector button and LED light diffusers fixed to the frame.

An exemplary seat belt buckle 50 according to a second embodiment of the present invention is shown in FIGS. 5-8 wherein; FIG. 5 is a perspective view of the exemplary seat belt buckle 50 according to the second embodiment in a fully assembled configuration; FIG. 6 is a top view of the exemplary seat belt buckle; FIG. 7 is a cross-section of the exemplary seat belt buckle 50 taken at line 7-7 of FIG. 6; and FIG. 8 is a perspective view of the exemplary seat belt buckle of FIG. 5 with the top and bottom covers 52, 54 removed and only the rear portion 61 of the button of the seat belt buckle shown with the seat belt buckle tongue ejector button 60 and light diffusers 64, 66 fixed to the frame or circuit board or other nearby component.

The illuminated seat belt buckle 50 of the second embodiment of the invention is substantially the same as the first embodiment of FIGS. 1-4 with the main differences being the shape and placement of the two diffusers 64, 66 of the second embodiment. The seat belt buckle 50 of the second embodiment has top and bottom covers 52, 54, and a first end 56 configured for fixation to a structural member of a vehicle to anchor the seat belt buckle to the vehicle. A second or entry end 58 of the seat belt buckle is provided with a slot 26 for receiving a seat belt buckle tongue (not shown) that is fixed to a length of seat belt webbing. An entry opening 20 of the slot 26 is located at the end 58 of the seat belt buckle opposite the end 56 of the seat belt buckle associated with a means for anchoring the seat belt buckle to a structural member of the vehicle. A seat belt buckle tongue ejection button 60 associated with an ejector mechanism is located at the second end of the seat belt buckle and is pushed by a vehicle occupant to release a seat belt buckle tongue from the seat belt buckle when the vehicle occupant wishes to exit the vehicle. The seat belt buckle tongue receiving slot 26 is associated with an entry slot 26 that functions as described above with respect to the first embodiment.

This second embodiment of an illuminated seat belt buckle is provided with two diffusers 64, 66 that are each provided with an LED light source. Each diffuser can be fixedly secured to a buckle frame or to an adjacent cover. Numeral 210 is illustrative of the diffuser mounted to an adjacent cover. Numeral 212 is illustrative of the diffuser mounted to the buckle frame. Each diffuser is opposedly positioned relative to an end of slot 26 and located on opposite side or ends of the slot 26. Each diffuser is preferably a solid transparent diffuser material but of a different shape that in the earlier embodiment. The seat belt buckle tongue receiving slot 26 has top and bottom edges and a pair of opposed sides or end edges.

The diffusers 64, 66 when illuminated indicate the location of the edges and other adjacent regions of the slot 26 into which a seat belt buckle tongue is inserted and the edge of the seat belt buckle tongue ejection button 60. Thus a vehicle occupant can easily locate where to insert the seat belt buckle tongue when buckling the seat belt or where to press to eject the seat belt buckle tongue when exiting the vehicle even under conditions of low or no ambient lighting. The two diffusers may be molded of the same clear polycarbonate material as described above in detail with respect to the first embodiment.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A seat belt buckle (10, 50) comprising:
   a first end (56) configured for fixing the seat belt buckle (10) to a component of a vehicle and a second end (58) opposite the first end provided with a button (28, 60) and a slot (26) configured to receive a seat belt buckle tongue (10a), the seat belt buckle (10) further comprising at least one light transmitter and diffuser (34, 64, 66) and a light source (39, 40, 41) for providing light to be transmitted through the at least one light transmitter and diffuser (34, 64, 66), the at least one light transmitter and diffuser (34, 64, 66) providing at least one user interface at the second end (58) of the seat belt buckle (10, 50) that indicates a general location of the slot (26) for receiving a seat belt buckle tongue (10*a*) and the seat belt buckle tongue ejection button (28, 60), and wherein three of the at least one of the light transmitters and diffusers (34, 64, 66) have three adjacent sides that indicate the general location of the slot (26) for receiving a seat belt buckle tongue (10*a*) and the seat belt buckle tongue ejection button (28, 60), wherein the slot (26) for receiving a seat belt buckle tongue (10*a*) has a pair of opposed long edges and a pair of opposed short edges, the seat belt buckle (10) has solid transparent or semi-solid transparent plastic or otherwise glass member, the two light transmitters and diffusers (64, 66) with an LED light source (39, 40, 41), each of the short edges of the slot (26) for receiving a seat belt buckle tongue (10*a*) being identified by a user interface of one of the LED light source (39, 40, 41), the light sources (39, 40, 41) being molded into the light transmitters and diffusers (64, 66), wherein the at least one light transmitter and diffuser (34, 64, 66) has light diffuser (34) having a three-sided perimeter shape configured to overlay the seat belt buckle tongue election button (60) wherein each side of the three adjacent sides includes a front face (164) and a rear face (166), and situated at the rear of each inner surface (162) is a projection (170), each projection (170) extends inwardly from its respective inner surface (162) and is formed with a recess (180), the structure of the projection about the recess (180) forming a wall (184) for receiving the light source, the light sources being LED light sources (39, 40, and 41), each LED is cylindrical in shape configured to fit within the recess (180) of the corresponding projections (170) within the walled portion (184), and wherein the front face (164) is transparent configured to transmit light along a light path (190) outlining the tongue slot (26) and the seat belt buckle tongue ejection button (60).

2. The seat belt buckle (10, 50) of claim 1 wherein the LED are over molded with at least one light transmitter and diffuser (34, 64, 66) formed about it or welded to the at least one light transmitter and diffuser (34, 64, 66) or snap or interference fit into the recess (180).

3. A seat belt buckle (10, 50) comprising:
a first end (56) configured for fixing the seat belt buckle (10, 50) to a component of a vehicle and a second end (58) opposite the first end provided with a seat belt buckle tongue ejection button (28, 60) and a slot (26) for receiving a seat belt buckle tongue (10*a*), the seat belt buckle (10) further comprising at least one light transmitter and diffuser (34, 64, 66), wherein each is a solid or semisolid transparent plastic or otherwise glass member, the at least one light transmitter and diffuser providing at least one user interface at the second end (58) of the seat belt buckle that indicates a location of the slot (26) for receiving a seat belt buckle tongue (10*a*) and the seat belt buckle tongue ejection button (28), wherein the at least one light transmitter and diffuser (34, 64, 66) providing the at least one user interface have three adjacent sides that provides the at least one user interface which indicate the location of the slot (26) for receiving the seat belt buckle tongue (10*a*) and the seat belt buckle tongue ejection button (28, 60) wherein the slot (26) for receiving a seat belt buckle tongue (10*a*) has a pair of opposed long edges and a pair of opposed short edges, the seat belt buckle having two of the at least one light transmitters and diffusers (64, 66), each of the short edges of the slot for receiving a seat belt buckle tongue (10*a*) being identified by a user interface of one of the at least one light transmitters and diffusers, wherein the at least one light transmitters and diffusers illuminates an entry end of the seat belt buckle (58) to highlight the location of the slot (26) in at least one of the seat belt buckle and the release button (28, 60) to a vehicle occupant, wherein the at least one light transmitter and diffuser transmit uniformly distributed light emitted by an associated light source (39, 40, 41) to provide the user interface to enable the occupant to insert a tongue (10*a*) into the buckle (10), wherein the at least one light transmitter and diffuser (34, 64, 66) has light diffuser (34) having a three-sided perimeter shape configured to overlay the seat belt buckle tongue ejection button (60) wherein each side of the three adjacent sides includes a front face (164) and a rear face (166), and situated at the rear of each inner surface (162) is a projection (170), each projection (170) extends inwardly from its respective inner surface (162) and is formed with a recess (180), the structure of the projection about the recess (180) forming a wall (184) for receiving the light source, the light sources being LED light sources (39, 40, and 41), each LED is cylindrical in shape configured to fit within the recess (180) of the corresponding projections (170) within the walled portion (184), and wherein the front face (164) is transparent configured to transmit light and the rear face (166) has an end (166*a*) with a layer to direct light through the diffuser (34) along a light path (190) outlining the tongue slot (26) and the seat belt buckle tongue election button (60).

4. The seat belt buckle (10, 50) of claim 3 wherein the at least one light transmitter and diffuser is associated with at least one light source (39, 40, 41) that has at least one light emitting diode (LED).

5. The seat belt buckle (10, 50) of claim 4 wherein each light source (39, 40, 41) of the at least one light source (39, 40, 41) associated with each light transmitter and diffuser (34, 64, 66) of the at least one light transmitter and diffuser (34, 64, 66) is provided with electrical power by a circuit including a power source.

6. The seat belt buckle (10, 50) of claim 3 wherein the at least one light transmitter and diffuser (34, 64, 66) is a solid or semi-solid plastic or otherwise transparent member for transmitting light from a light source to provide or create a user interface made of a solid or semi solid plastic material.

7. The seat belt buckle (10, 50) of claim 6 wherein the at least one light transmitter and diffuser (34, 64, 66) is a molded plastic light transmitter and diffuser (34) having a shape that employs curved surfaces (170) that enhance the light reflecting off angled corners.

8. The seat belt buckle (10, 50) of claim 3 wherein the at least one light transmitter and diffuser (34, 64, 66) includes a plurality of light transmitters and diffusers (34, 64, 66) molded from a single piece of plastic, permitting easy assembly into the buckle (10, 50).

9. The seat belt buckle (10, 50) of claim 3 wherein the at least one light transmitter and diffuser (34, 64, 66) is snapped into place or heat welded to a local plastic part of a cover along locations of the welds to portions of one of the covers (16).

10. The seat belt buckle (10, 50) of claim 3 where the at least one light transmitter and diffuser (34, 64, 66) is secured to a portion of the frame (22) by snap or interference fit.

* * * * *